United States Patent Office 3,172,916
Patented Mar. 9, 1965

3,172,916
BISPHENOL A—PREPARATION USING ION EXCHANGE RESIN CONTAINING MERCAPTO AND SULFONIC ACID GROUPS
Romeo B. Wagner, Wilmington, Del., assignor to Hercules Powder Company, Wilmington, Del., a corporation of Delaware
No Drawing. Filed June 14, 1960, Ser. No. 35,906
3 Claims. (Cl. 260—619)

This invention relates to the preparation of 2,2-bis(4-hydroxyphenyl) propane by the condensation of phenol and acetone.

In copending application Serial No. 35,905, filed June 14, 1960 by Chester E. Smith, Jr., there is disclosed the preparation of 2,2-bis(4-hydroxyphenyl) propane by the condensation of phenol and acetone in the presence of a mercaptan and an insoluble sulfonic acid ion exchange resin.

In accordance with the present invention, it has now been found that the condensation is greatly facilitated by contacting the phenol and acetone with a substantially insoluble cation exchange resin which contains sulfonic acid groups and mercapto groups as part thereof.

The catalyst of this invention is basically a polymeric resin having sulfonic acid groups and mercapto groups chemically bound thereto. The sulfonic acid groups are strongly acid groups and are in the acidic form. The resin is insoluble in aqueous and non-aqueous media and is stable at temperatures of the condensation reaction of this invention. The chemical nature of the resin, other than that it contains sulfonic acid groups and mercapto groups, is not critical. Such a resin is useful in both batch process and continuous process condensations and particularly the latter.

Insoluble ion exchange resins which contain both mercaptan groups and sulfonic acid groups are readily prepared by reacting a sulfonatable insoluble ion exchange resin already containing sulfonic acid groups with chlorosulfonic acid, whereby sulfonyl chloride groups are introduced into the resin containing also sulfonic acid groups, and the sulfonyl chloride groups are subsequently reduced to mercaptan groups by known methods such as reduction with metallic tin and hydrochloric acid. The insoluble ion exchange resins of this invention may also be prepared by reacting a suitable insoluble polymeric resin containing benzene rings such as a styrene-divinylbenzene copolymer with chlorosulfonic acid to introduce sulfonyl chloride groups, part of which may be reduced chemically to the mercaptan and part of which may be hydrolyzed to the sulfonic acid.

Examples of suitable resins which are commercially available and can be chlorosulfonated and reduced so that mercapto groups are introduced therein are styrene-divinylbenzene copolymer sulfonic acid such as Amberlite–IR–120 and Dowex–50. U.S. 2,500,149 and U.S. 2,366,007 describe such resins from which the catalyst of this invention can be produced. Sulfonated condensation polymers of phenol and formaldehyde which are capable of being further sulfonated are also suitable for conversion into the mercapto-substituted sulfonic acid-containing ion exchange resins suitable as catalysts in this invention. The sulfonic acid-containing ion exchange resins which are capable of being substituted by mercapto groups for use in this invention are high molecular weight polyacids which are insoluble in aqueous and non-aqueous media both before and after introduction of the mercapto group. Related polymeric resins containing sulfonic acid groups are made by sulfonating mixed phenol-thiophenol formaldehyde resins. They all comprise an insoluble cross-linked polymeric structure of carbon atoms containing aromatic rings on which the sulfonic acid groups are situated and on which the mercapto groups are likewise situated after treatment for the introduction of the mercapto and sulfonic acid groups.

The number of sulfonic acid and mercapto groups present in the ion exchange resin determines the effectiveness as a catalyst. The sulfonic acid groups should amount to at least 2 milli-equivalents of —$SO_3H$ groups per gram of catalyst and for substantial improvement in catalytic activity over the resin containing —$SO_3H$ group and no mercapto groups, the ratio of —SH groups to sulfonic acid groups should be at least 1:10 and should not exceed 1:1. The upper limit of sulfonic acid groups will be about 8 milli-equivalents of —$SO_3H$ groups per gram of catalyst, and obviously in such a catalyst, the ratio of —SH groups to —$SO_3H$ groups will be nearer the lower limit of 1:10 than nearer the upper limit of 1:1. The preferred range of —SH to —$SO_3H$ ratios is 1:1 to 1:5, and the preferred concentration of —$SO_3H$ groups in the resin is 3 to 5 milli-equivalents —$SO_3H$ per gram. The preferred catalysts are those made by introduction of mercapto and sulfonic acid groups into a styrene-divinylbenzene polymeric resin.

In the catalysts of this invention the —$SO_3H$ and —SH groups will be free and not combined with metals. As in the sulfonic acid ion exchange resins containing no mercapto groups, the catalysts of this invention will generally contain some bound water, but this may be removed by displacement with phenol, through distillation, or diffusion techniques, or the catalyst may be dried in an oven, and under reduced pressure, if desired. A dried resin which has been soaked in phenol is in an effective form for the start of the condensation process of a phenol-acetone mixture.

The catalyst used in the process of this invention may be of any convenient particle size for ease of handling and use in either batch or continuous process. The catalyst is preferably porous with pores of sufficient size to permit free flow of the reaction mixture, and it may be in the form of microspheres or beads.

The condensation reaction between phenol and acetone takes place at any temperature in the range of about 20° C. to about 110° C. The reaction is preferably carried out at a temperature in the range of 50–110° C. At the lower temperatures, the time of contact with the catalyst is longer than at the higher of these temperatures. In continuous processes, this is easily regulated by rate of flow of the phenol and acetone through the catalyst.

The bisphenol-A reaction product is physically separated from the catalyst, and the catalyst may be reused with or without washing with fresh phenol or other solvent. The crude reaction product may then be treated in any of a number of ways to separate unreacted phenol from the 2,2-bis(4-hydroxyphenyl) propane, and the latter may be purified by crystallization from an organic solvent such as benzene or toluene. A satisfactory product for many purposes is produced by distilling phenol from the crude reaction product in vacuo, with steam or without steam, and residual phenol may be washed out of the product with water before recovery of the 2,2-bis(4-hydroxyphenyl) propane as residue.

The reactants undergo reaction in the ratio of two molecules of phenol to one acetone, but this ratio need not be adhered to for the ratio of reactants introduced into the reaction. The phenol-acetone mole ratio may actually vary over a wide range, from 3:1 to 20:1, for example. It is more economical, on the basis of conversion, to use a mole ratio in the range of 4:1 to 12:1, however.

The following examples, in which parts and percentages are by weight, illustrate the method of carrying out the process of this invention.

*Preparation of the catalyst*

To a mixture of 270 parts of dried Dowex–50–WX4 (50–100 mesh), (a sulfonated styrene-divinylbenzene ion exchange resin), and 1260 parts ethylene chloride at 9° C. was added dropwise with stirring 212 parts chlorosulfonic acid in 150 parts ethylene chloride. By means of cooling, the temperature was held at 15° C. until the main part of the reaction was complete, and the temperature was then allowed to rise gradually to 26° C. without cooling. The insoluble resin was then separated by filtration, washed with ethylene chloride, and suspended in 3550 parts 37% aqueous hydrochloric acid at 20° C. To this mixture was added 600 parts granular tin in small portions over a 2-hour period, and then the temperature was raised to 80° C. to dissolve all of the tin. The insoluble resin was filtered out, washed with 10% hydrochloric acid until free of tin salts and then with water until free of hydrochloric acid. Water was removed from the recoverd resin by azeotropic distillation with benzene, and benzene was removed by heating in vacuo. The dried insoluble ion exchange resin was shown by analysis to contain 3.5 milli-equivalents sulfonic acid groups and 1.0 milli-equivalent of mercapto groups per gram. The original Dowex–50–WX4 ion exchange resin contained 5.3 milli-equivalents sulfonic acid groups per gram and no mercapto groups. In repeated preparations using more and less tin in the reduction, catalysts containing various ratios of —SH groups to —$SO_3H$ groups were produced.

*Condensation of phenol and acetone*

A mixture of 94 parts phenol and 12 parts of insoluble ion exchange resin containing sulfonic acid groups and mercapto groups in various proportions, and prepared essentially as above, was heated to 76° C. and then 15 parts acetone was added with stirring. The temperature rose to 82° C. and was held at approximately this temperature for 6 hours, and during this time, samples were taken after 1, 3 and 6 hours for analysis. The following results were obtained:

| Example | Catalyst Resin | | | Conversion to Bisphenol-A (percent) | | |
|---|---|---|---|---|---|---|
| | —$SO_3H$, m.eq./g. | —SH, m.eq./g. | —SH:$SO_3H$ Ratio | 1 hr. | 3 hrs. | 6 hrs. |
| 1 | 5.3 | 0 | | 11 | 25 | |
| 2 | 4.2 | 0.9 | 0.24:1 | 61 | 77 | 90 |
| 3 | 3.5 | 1.0 | 0.29:1 | 72 | 94 | 94 |
| 4 | 3.0 | 1.6 | 0.53:1 | 27 | 76 | 86 |
| 5 | 2.4 | 2.2 | 0.92:1 | 42 | 77 | 86 |

Example 1 shows the conversion after 1 hour and after 3 hours using a sulfonated ion exchange resin having no mercapto groups, and the subsequent examples show corresponding conversions with resins containing various ratios of mercapto groups. The greater conversions in using the catalyst containing both mercapto groups and sulfonic acid groups of this invention show a decided improvement over the resin containing sulfonic acid groups but no mercapto groups.

The catalysts of this invention are reusable and are particularly useful in continuous processes since the catalyst maintains its high activity over long periods of time.

What I claim and desire to protect by Letters Patent is:
1. The method for the production of 2,2-bis(4-hydroxyphenyl) propane which comprises contacting phenol and acetone at a temperature of 20° C. to 110° C. with a cation exchange resin catalyst which comprises an insoluble cross-linked polymeric structure of carbon atoms containing aromatic rings on which sulfonic acid groups are situated and on which mercapto groups are likewise situated, which resin is substantially insoluble in the reaction mixture and which contains the mercapto groups and the sulfonic acid groups in a ratio in the range of 1:10 to 1:1.
2. The process of claim 1 in which the reaction temperature is in the range of 50–110° C.
3. The process of claim 1 in which the phenol and acetone in a ratio in the range of 3:1 to 20:1 are contacted with the catalyst.

References Cited in the file of this patent
UNITED STATES PATENTS

| | | |
|---|---|---|
| 2,468,982 | Jansen | May 3, 1949 |
| 2,730,552 | Williamson | Jan. 10, 1956 |
| 2,858,280 | Maltha | Oct. 28, 1958 |
| 2,891,916 | Hwa | June 23, 1959 |
| 2,927,084 | Wahl | Mar. 1, 1960 |
| 3,049,569 | Apel et al. | Aug. 14, 1962 |